（12） United States Patent
Liu et al.

(10) Patent No.: US 11,037,311 B2
(45) Date of Patent: Jun. 15, 2021

(54) METHOD AND APPARATUS FOR AUGMENTING DATA IN MONITORING VIDEO

(71) Applicant: FUJITSU LIMITED, Kawasaki (JP)

(72) Inventors: Xiaoqing Liu, Beijing (CN); Zhiming Tan, Beijing (CN); Xianghui Bai, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 79 days.

(21) Appl. No.: 15/909,424

(22) Filed: Mar. 1, 2018

(65) Prior Publication Data

US 2018/0330513 A1 Nov. 15, 2018

(30) Foreign Application Priority Data

May 9, 2017 (CN) .......................... 201710321532.9

(51) Int. Cl.
| | |
|---|---|
| *G06K 9/00* | (2006.01) |
| *G06T 7/33* | (2017.01) |
| *G06T 5/50* | (2006.01) |
| *G06T 19/20* | (2011.01) |
| *G06K 9/66* | (2006.01) |

(Continued)

(52) U.S. Cl.
CPC .......... *G06T 7/337* (2017.01); *G06K 9/00711* (2013.01); *G06K 9/6256* (2013.01); *G06K 9/66* (2013.01); *G06T 5/50* (2013.01); *G06T 7/344* (2017.01); *G06T 19/006* (2013.01); *G06T 19/20* (2013.01); *G06K 9/3233* (2013.01);

(Continued)

(58) Field of Classification Search
None
See application file for complete search history.

(56) References Cited

U.S. PATENT DOCUMENTS

| | | | | |
|---|---|---|---|---|
| 7,796,155 B1* | 9/2010 | Neely, III | .......... | G06K 9/00771 345/418 |
| 8,473,981 B1* | 6/2013 | Gargi | ................ | G06K 9/00744 725/40 |

(Continued)

FOREIGN PATENT DOCUMENTS

| | | |
|---|---|---|
| CN | 102156960 | 8/2011 |
| CN | 104125385 | 10/2014 |
| CN | 104954741 | 9/2015 |

OTHER PUBLICATIONS

Chinese Office Action dated Jan. 6, 2020 in Chinese Patent Application No. 201710321532.9.

*Primary Examiner* — Wei Wen Yang
(74) *Attorney, Agent, or Firm* — Staas & Halsey LLP

(57) ABSTRACT

A method and a device for augmenting data in a monitoring video are provided which includes: selecting randomly, based on a function to be implemented for the data and a parameter range which are set by a user or by default, one or more processing functions to be performed on the data and parameters of the processing functions; processing the data using the selected one or more processing functions, to obtain new data; and repeating the above processes until a required amount of data is generated. With the method, monitoring data having diversity and a small size can be obtained with only a few input samples, and a high degree of randomness and comprehensiveness of the augmented data can be achieved.

15 Claims, 9 Drawing Sheets

(51) Int. Cl.
 *G06T 19/00* (2011.01)
 *G06K 9/62* (2006.01)
 *G06K 9/32* (2006.01)

(52) U.S. Cl.
 CPC ............. *G06K 2009/00738* (2013.01); *G06T 2207/20221* (2013.01)

(56) References Cited

U.S. PATENT DOCUMENTS

| | | | |
|---|---|---|---|
| 2005/0069207 A1* | 3/2005 | Zakrzewski | B64D 45/0015 382/190 |
| 2010/0253489 A1* | 10/2010 | Cui | G01S 13/723 340/425.5 |
| 2015/0182118 A1* | 7/2015 | Bradbury | A61B 1/043 600/431 |
| 2017/0123487 A1* | 5/2017 | Hazra | G06F 3/015 |
| 2018/0107341 A1* | 4/2018 | Aurongzeb | G06F 3/017 |

* cited by examiner

METHOD AND APPARATUS FOR AUGMENTING DATA IN MONITORING VIDEO

CROSS-REFERENCE TO RELATED APPLICATIONS

This application claims the benefit of Chinese Application No. 201710321532.9, filed on May 9, 2017, in the Chinese Intellectual Property Office, the disclosure of which is incorporated herein by reference.

BACKGROUND

1. Field

The present disclosure relates to the field of data processing, and in particular to a method and an apparatus for augmenting data in a monitoring video.

2. Description of the Related Art

In monitoring video analysis based on machine learning, training data is expensive and insufficient, especially for applications customized for users.

Therefore, it is desirable to provide a method for augmenting insufficient data in a monitoring video.

SUMMARY

In the following, an overview of the present disclosure is given simply to provide basic understanding to some aspects of the present disclosure. It should be understood that this overview is not an exhaustive overview of the present disclosure. It is neither intended to determine a critical part or an important part of the present disclosure, nor to limit the scope of the present disclosure. An object of the overview is only to give some concepts in a simplified manner, which serves as a preface of a more detailed description described later.

An object of the present disclosure is to provide a method for augmenting data in a monitoring video, which includes: selecting randomly, based on a function to be implemented for the data and a parameter range which are set by a user or by default, one or more processing functions to be performed on the data and parameters of the processing functions; processing the data using the selected one or more processing functions, to obtain new data; and repeating the selecting and the processing until a required amount of data is generated.

According to an aspect, an apparatus for augmenting data in a monitoring video is provided. The apparatus includes: a function selection unit configured to select randomly, based on a function to be implemented for the data and a parameter range which are set by a user or by default, one or more function sub-units for processing the data; a processing unit, configured to process the data using the selected one or more function sub-units, to obtain new data; and a repetition control unit, configured to repeat processing performed by the function selection unit and the processing unit, until a required amount of data is generated.

In addition, a computer program for implementing the above method is further provided according to the embodiments of the present disclosure.

Besides, a computer program product in at least a form of computer readable medium is further provided according to the embodiments of the present disclosure, where computer program codes for implementing the above method are recorded in the computer program product.

These and other advantages of the present disclosure may become more apparent by describing preferred embodiments of the present disclosure in detail in conjunction with the drawings below.

BRIEF DESCRIPTION OF THE DRAWINGS

The above and other objectives, features and advantages of the present disclosure can be understood more easily with reference to the description of the embodiments of the present disclosure in conjunction with the drawings below. The components in the drawings are only for illustrating the principle of the present disclosure. In the drawings, the same or similar technical features or components are represented with the same or similar reference numerals.

DETAILED DESCRIPTION

Figure 1:
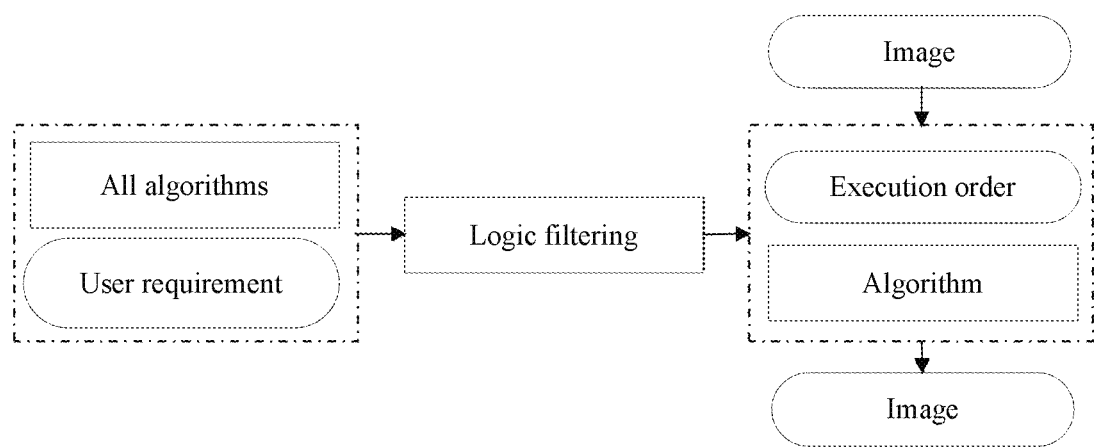
FIG. 1 shows a schematic diagram of a system for implementing a method for augmenting data in a monitoring video according to the present disclosure.

Reference will now be made in detail to the embodiments, examples of which are illustrated in the accompanying drawings, wherein like reference numerals refer to the like elements throughout. The embodiments are described below by referring to the figures.

An exemplary embodiment of the present disclosure will be described hereinafter in conjunction with the drawings. For conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

According to the present disclosure, it is provided a method for augmenting training data for machine learning in the case that data in a monitoring video is insufficient. With the method, monitoring data having diversity and a small size can be obtained with only a few input samples. In order to achieve a high degree of randomness and comprehensiveness of the augmented data, the method according to the present disclosure provides randomness in selecting functions and parameters of the functions.

Augmenting the data includes simulating a real monitoring environment, such as different camera qualities, different angles of view, day and night, image scenes and different weather conditions, by operating an image and a video, which facilitates performing training and analysis in a monitoring application.

The following functions can be achieved for an input image or video with the data augmenting method according to the present disclosure: spatial transformation, illumination change, noise filtering, scene synthesis, event modification, and the like. Each of the functions includes different methods meeting the requirement of the function and generates a different result.

One or more functions may be randomly selected or combined to be performed on the data to generate different results. FIG. 1 shows a schematic diagram of a system for implementing a method for augmenting data in a monitoring video according to the present disclosure. In FIG. 1, All algorithms indicate all functions and methods related to the functions to be performed on the data; User requirement is used for indicating which function can be used, which method can be applied in the selected function, and a parameter setting or range; Logic filtering is used for automatically deriving, based on the user requirement and all provided algorithms, an execution order of the algorithms and selecting randomly a value from the parameter range, to finally make it clear how the algorithms are to be performed on the image; Execution order indicates an execution order of the algorithms generated with the logic filtering; and Algorithm indicates the selected algorithm and the parameter corresponding to the selected algorithm.

With the system shown in FIG. 1, based on the user requirement, functions to be performed on an image can be automatically selected from all functions to be performed on data, and an execution order of the functions can be automatically determined, thereby generating a new image.

Hereinafter, a method and an apparatus for augmenting data in a monitoring video according to the embodiments of the present disclosure are described in detail in conjunction with the drawings. The descriptions below are in the following order:

1. Method for augmenting data in a monitoring video;
2. Apparatus for augmenting data in a monitoring video; and
3. Computing device for implementing the method and the apparatus according to the present disclosure.

[1. Method for Augmenting Data in a Monitoring Video]

Figure 2:
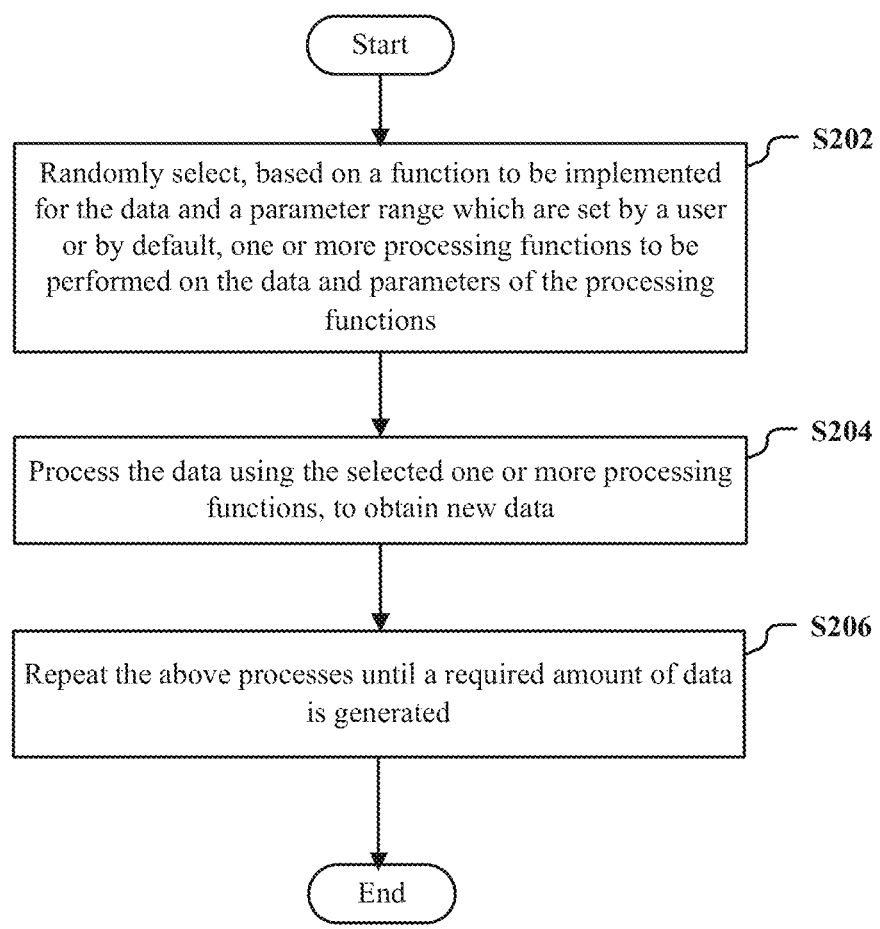
FIG. 2 shows a flowchart of an exemplary process of a method 200 for augmenting data in a monitoring video according to an embodiment of the present disclosure.

FIG. 2 shows a flowchart of an exemplary process of a method 200 for augmenting data in a monitoring video according to an embodiment of the present disclosure.

First, in step S202, one or more processing functions to be performed on the data and parameters of the processing functions are selected randomly based on a function to be implemented for the data and a parameter range which are set by a user or by default.

Next, in step S204, the data is processed using the selected one or more processing functions, to obtain new data.

Finally, in step S206, steps S202 and S204 are repeated until a required amount of data is generated.

In an example, the multiple processing functions may include spatial transformation, illumination change, noise filtering, scene synthesis and event modification.

Each of the processing functions is described in detail below.

Spatial Transformation

The spatial transformation is used for transforming imaging spatial relationship and a position of an object in an image, and may include: image spatial stretching, image rotation, image cropping and image distortion simulation.

The image spatial stretching is used for stretching an image according to a specified aspect ratio, the width of the image, or the height of the image. In the case that a size of the image is specified, and an original aspect ratio is desired to be maintained, an image filling algorithm may be needed.

Figure 3A:
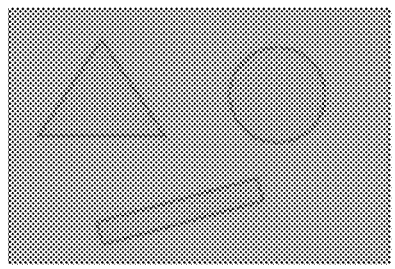
FIGS. 3A to 3E show some schematic diagrams of image spatial stretching.
Figure 3B:
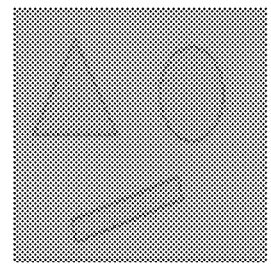
Figure 3C:
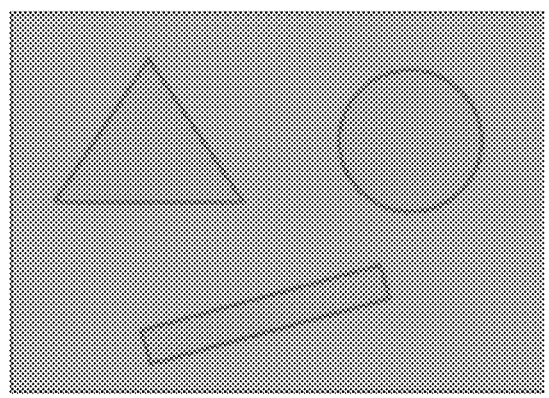
Figure 3D:
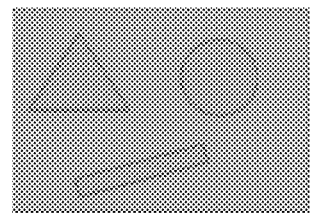
Figure 3E:
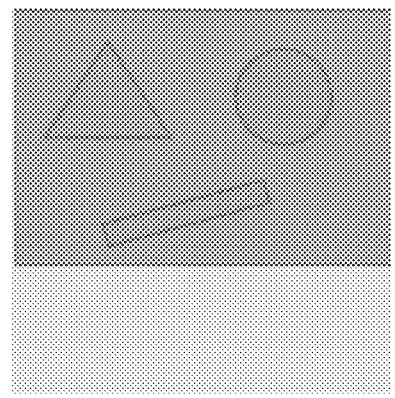

FIGS. 3A to 3E show some schematic diagrams of image spatial stretching. FIG. 3A shows an original image. In FIG. 3B, the entire image is stretched to a specified aspect ratio. In FIG. 3C and FIG. 3D, the image is enlarged and reduced, respectively. In FIG. 3E, the image is stretched to a specified size, and image filling is performed on the image to maintain geometric invariance.

The image rotation is used for rotating the image without violating a conventional angle of view.

Figure 4A:
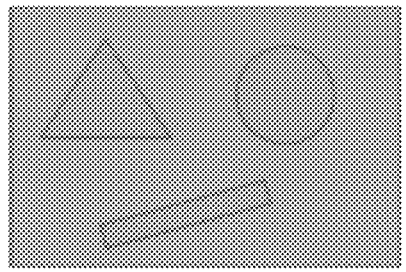
FIGS. 4A to 4D show views of rotating an image.
Figure 4B:
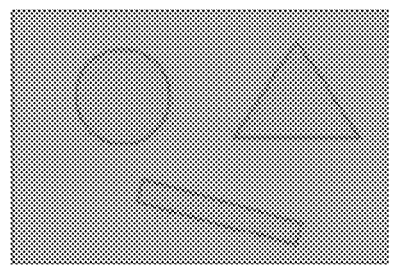
Figure 4C:
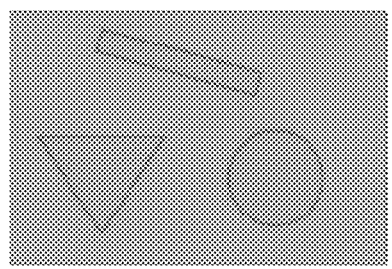
Figure 4D:
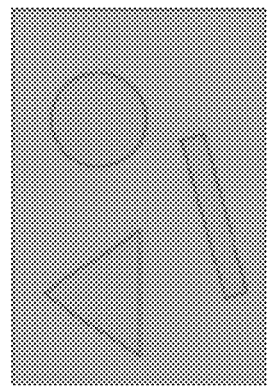

FIGS. 4A to 4D show rotations of an image. FIG. 4A shows an original image. In FIG. 4B, the image is rotated. FIGS. 4C and 4D show erroneous images violating the conventional angle of view.

A desirable new image can be obtained by flipping the image. In addition, the original/flipped image may be rotated randomly by a rotation angle in a range of $[-a°, +a°]$, where a is an arbitrary positive number and is generally set to be less than 5.

The image cropping is used for cropping an image according to a specified size and a specified sampling rule. For example, the size of an image is (w, h), and the size of the cropped image is ($\alpha$w, $\beta$h), where $\alpha, \beta \in (0,1]$, w represents the width, h represents the height, and $\alpha$ and $\beta$ are scaling factors. The number of the cropped images N is expressed by:

$$N = \text{round}(1/\alpha) * \text{round}(1/\beta) = A*B.$$

In the above equation, round indicates round-up, hence round(1/0.4)=3. First, the width is equally divided into A portions. In this case, there are A+1 cropping points (including endpoints and equal division points) in a width direction. If A is an even number, A/2 sub-images are obtained by successively cropping the image according to the size ($\alpha$w, $\beta$h) from left to right, with a point at the top-left corner of the sub-image coinciding with the cropping point, while the remaining A/2 sub-images are obtained by cropping the image from right to left, with a point at the top-right corner of the sub-image coinciding with the cropping point. If A is an odd number, (A−1) sub-images are first obtained by cropping the image in the above manner. Then, the remaining one sub-image is obtained such that the remaining sub-image has the same height as the cropped (A−1) sub-images, and an x coordinate of a center point of the remaining sub-image is the same as an x coordinate of a center point x of the original image (x indicates a position in the width direction). A cropping position in the height direction is determined in a similar manner. The cropping process performed in the width direction is repeated at each cropping position in the height direction, thereby obtaining all sub-images which can cover the entire image.

Figure 5:
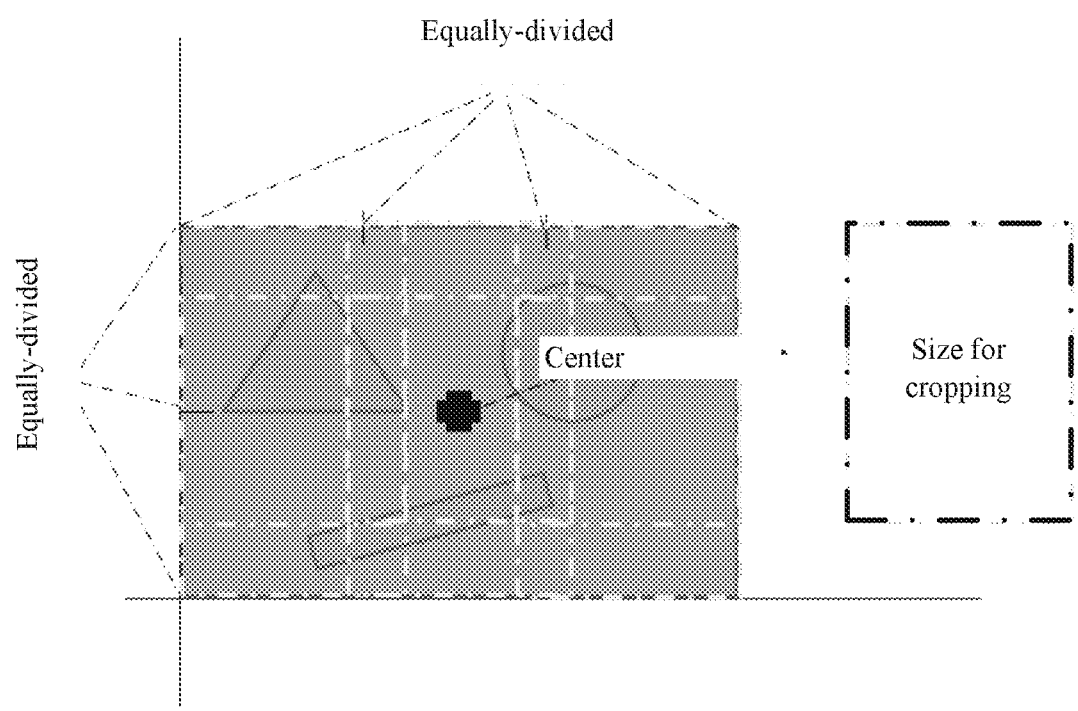
FIG. 5 shows a schematic diagram of cropping an image.

FIG. 5 shows a schematic diagram of cropping an image. In FIG. 5, it is assumed that α=0.4 and β=0.8.

The image distortion simulation is simulating images captured by different imaging apparatuses.

First, a distortion of the image is corrected based on a known parameter of the imaging device.

Then, a new camera imaging parameter is applied to the corrected image.

Illumination Change

The illumination change function is used for simulating different imaging light conditions. The illumination change includes a random illumination change and a video scene-based illumination change.

The random illumination change includes: in a color space including hue, such as an HSV (Hue, Saturation, Value) color space or an HSL (Hue, Saturation, Luminance) color space, values of one or more of color components other than the hue component are changed randomly, while the hue component is maintained unchanged.

With regard to the video scene-based illumination change, since videos captured in a same scene at different times during a day have different illuminations, the color of the image is changed based on a previous frame or a following frame so that the illumination of the image is reasonable.

Figure 6:
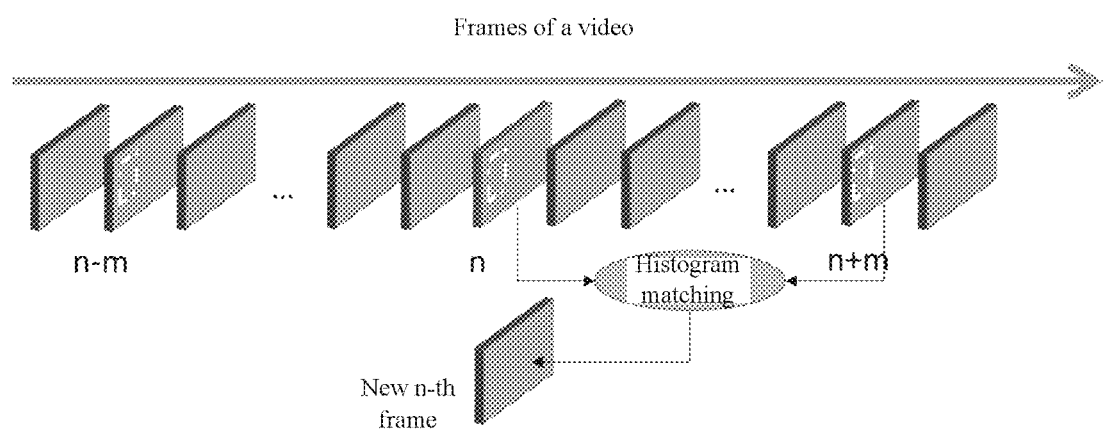
FIG. 6 shows a schematic diagram of performing illumination change on an image based on a video scene.

Specifically, for an n-th frame in a video, a frame which precedes or follows the n-th frame and is spaced from the n-th frame by m frames is selected randomly as a reference, and a new n-th frame is obtained by applying histogram matching to an (n+m)-th frame or an (n−m)-th frame, with n and m being positive integers. Each frame of the video is processed as above to obtain a new image. The histogram may be calculated based on the entire frame, or a region in the frame selected with a self-adaptive algorithm or a user-specified algorithm. FIG. 6 shows a schematic diagram of performing illustration change on an image based on a video scene.

Noise Filtering

The noise filtering function is based on a consideration of imaging difference under random interference. The noise filtering includes noise addition and out-of-focus simulation.

The noise addition includes changing an original value of a pixel at a random position in an image with a random number, which may be performed using a random number generator such as a Gaussian or average random number generator. A new image may be obtained by applying one or more noise addition methods.

The out-of-focus simulation includes resetting values of all or a part of pixels in an image calculated using a filtering function based on values of neighboring pixels, or performing out-of-focus simulation based on a camera parameter and an estimated object distance.

In addition, the out-of-focus may be reproduced based on the estimated object distance. Specifically, an object distance is first estimated, and then the out-of-focus is simulated based on the camera parameter and the estimated object distance.

Scene Synthesis

A virtual image can be provided by the scene synthesis function. The scene synthesis function includes a material library, an action generator and a scene controller.

The material library is configured to provide materials of an object and a scene which exist in a monitoring video.

The action generator is configured to simulate various actions such as crash, fall, running and braking, to support event generation.

The scene controller is configured to organize the materials from the material library and generate a virtual monitoring image according to built-in logic blocks. The controller may specify various scenes, the weather, time of day, targets, target positions, events, shooting angles, imaging devices and the like. For example, a cube may be synthesized on a road in the image to simulate an abandoned object. Some pedestrians may be copied from one scene to another to simulate a crowded environment.

Event Modification

The event modification function provides a tool for editing an original image and changing a scene or an object in the image. The event modification may include event deletion and event addition.

Figure 7A:
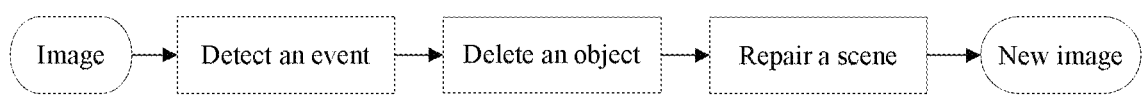
FIG. 7A shows a schematic flowchart of event deletion.

The event deletion includes detecting an event, deleting an object related to the event and repairing a scene in which the object is deleted to generate a new image. FIG. 7A shows a schematic flowchart of event deletion.

Figure 7B:
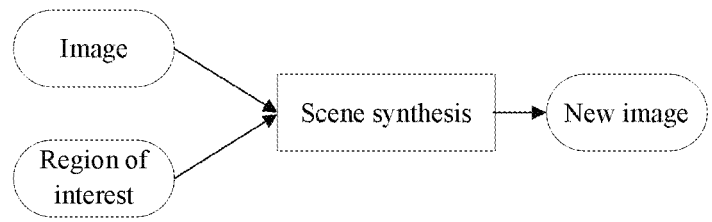
FIG. 7B shows a schematic flowchart of event addition.

The event addition includes: extracting scene information, specifying an event range (ROI, region of interest), and adding an event using a function from the scene synthesis. FIG. 7B shows a schematic flowchart of event addition.

The above one or more processing functions to be performed on the data may be performed in a random order. In the case that the selected multiple processing functions include the scene synthesis, the scene synthesis is first performed on the data, and then the processing functions other than the scene synthesis are performed in a random order.

In the integrated method for augmenting data in a monitoring video according to the present disclosure, one or more processing functions to be performed on the data and parameters of the processing functions can be automatically selected based on a function to be implemented for the data and the parameter range which are set by a user or by default, so that augmentation of the data in the monitoring video is more easy and efficient. With the method according to the present disclosure, monitoring data having diversity and a small size can be obtained with only a few input samples, and a high degree of randomness and comprehensiveness of the augmented data can be achieved.

[2. Apparatus for Augmenting Data in a Monitoring Video]

Figure 8:
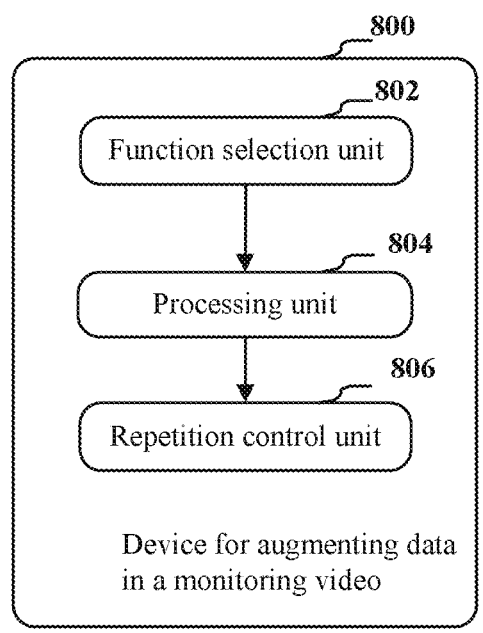
FIG. 8 is a block diagram showing an exemplary configuration of an apparatus 800 for augmenting data in a monitoring video according to another embodiment of the present disclosure.

FIG. 8 is a block diagram showing an exemplary configuration of an apparatus 800 for augmenting data in a monitoring video according to another embodiment of the present disclosure.

As shown in FIG. 8, the device 800 for augmenting the data in a monitoring video includes a function selection unit 802, a processing unit 804, such as a computer, and a repetition control unit 806.

The function selection unit 802 is configured to select randomly, based on a function to be implemented for the data and a parameter range which are set by a user or by default, one or more function sub-units for processing the data.

The processing unit 804 is configured to process the data using the selected one or more function sub-units, to obtain new data.

The repetition control unit 806 is configured to repeat the processing performed by the function selection unit and the processing unit, until a required amount of data is generated.

The function sub-units include a spatial transformation sub-unit, an illumination change sub-unit, a noise filtering sub-unit, a scene synthesis sub-unit and an event modification sub-unit.

The processing of the selected multiple function sub-units is performed in a random order. In the case that the selected function sub-units include the scene synthesis sub-unit, the data is first processed using the scene synthesis sub-unit, and then the processing of the function sub-units other than the scene synthesis sub-unit is performed in a random order.

The spatial transformation sub-unit is configured to perform one or more of: image spatial stretching, image rotation, image cropping and image distortion simulation.

The image distortion simulation is simulating images captured by different imaging apparatuses, and includes: correcting a distortion of the image based on a known parameter of the imaging apparatus; and applying a new imaging parameter to the corrected image.

The illumination change sub-unit is configured to perform one or more of a random illumination change and a video scene-based illumination change.

The random illumination change includes: in a color space including hue, randomly changing values of one or more color components other than the hue while maintaining the hue unchanged.

The video scene-based illumination change includes processing each frame of a video by: for an n-th frame of the video, selecting randomly a frame which precedes or follows the n-th frame and is spaced from the n-th frame by m frames as a reference, and applying histogram matching to an (n+m)-th frame or an (n−m)-th frame to obtain a new n-th frame, with n and m being any positive integers.

The noise filtering sub-unit is configured to perform one or more of noise addition and out-of-focus simulation.

The noise addition includes changing an original value of a pixel at a random position in an image with a random number.

The out-of-focus simulation includes resetting values of all or a part of pixels in an image calculated using a filtering function based on values of neighboring pixels or performing an out-of-focus simulation based on a camera parameter and an estimated object distance.

The scene synthesis sub-unit is configured to provide, through a material library, materials of an object and a scene which exist in the monitoring video, simulate various actions and organize the materials from the material library to generate a virtual monitoring image.

The event modification sub-unit is configured to perform one or more of event deletion and event addition.

The event deletion includes: detecting an event; deleting an object related to the event; and repairing a scene in which the object is deleted to generate a new image.

The event addition includes: extracting scene information; specifying an event range; and adding an event using a function from the scene synthesis.

One can refer to the embodiment of the method for augmenting data in a monitoring video according to the present disclosure which is described in conjunction with FIGS. 1-7 for details of operations and functions of the components of the device 800 for augmenting data in a monitoring video, which are not described in detail herein.

It should be noted that, structures of the device 800 for augmenting data in a monitoring video and components of the device 800 are only exemplary, and the block diagram illustrating the structure shown in FIG. 8 can be modified by those skilled in the art as needed.

[3. Computing Device for Implementing the Method and the Apparatus According to the Present Disclosure]

The basic principles of the present disclosure have been described above in conjunction with specific embodiments. However, it should be noted that, it can be understood by those skilled in the art that all or any of the steps or components of the methods and the apparatuses according to the present disclosure may be implemented in forms of hardware, firmware, software, or a combination thereof, in any computing device (including a processor, a storage medium and the like) or in a network of computing device, which can be implemented by those skilled in the art by means of basic programming skills upon reading the description of the present disclosure.

Therefore, the object of the present disclosure may be also implemented by running a program or a group of programs on any computing device. The computing device may be a known general device. In this case, the object of the present disclosure may be also implemented by only providing a program product containing program codes for implementing the method and device. That is to say, the present disclosure may be also constructed by such program product, and may be also constructed by a storage medium storing such program product. Apparently, the storage medium may be any known storage medium or any storage medium to be developed in the future.

Figure 9:
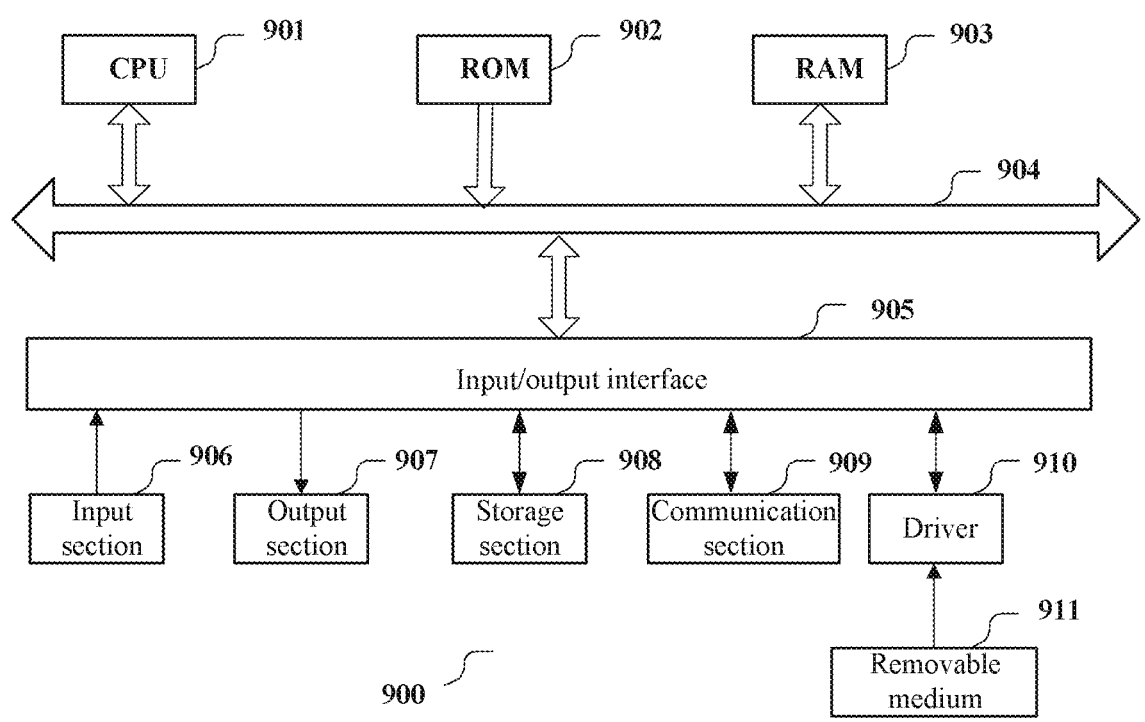
FIG. 9 is an exemplary structural diagram of a computing device for implementing the method and the apparatus for augmenting data in a monitoring video according to the present disclosure.

In the case where the present disclosure is realized by software or firmware, a program constituting the software is installed in a computer with a dedicated hardware structure such as the general computer 900 shown in FIG. 9 from a storage medium or network. The computer is capable of implementing various functions when installed with various programs.

In FIG. 9, a central processing unit (CPU) 901 executes various processing according to a program stored in a read-only memory (ROM) 902 or a program loaded to a random access memory (RAM) 903 from a memory section 908 to perform the operations and functions described herein. The data needed for the various processing of the CPU 901 may be stored in the RAM 903 as needed. The CPU 901, the ROM 902 and the RAM 903 are linked with each other via a bus 904. An input/output interface 905 is also linked to the bus 904.

The following components are linked to the input/output interface 905: an input section 906 (including keyboard, mouse and the like), an output section 907 (including displays such as a cathode ray tube (CRT), a liquid crystal display (LCD), a loudspeaker and the like), a memory section 908 (including hard disc and the like), and a communication section 909 (including a network interface card such as a LAN card, a modem and the like). The communication section 909 performs communication processing via a network, such as the Internet. A driver 910 may also be linked to the input/output interface 905, if needed. If needed, a removable medium 911 such as a magnetic disc, an optical disc, a magnetic optical disc and a semiconductor memory may be installed in the driver 910, so that the computer program read therefrom is installed in the memory section 908 as appropriate.

In the case where the foregoing series of processing is achieved with software, programs constituting the software are installed from a network such as the Internet or a storage medium such as the removable medium 911.

It should be appreciated by those skilled in the art that the memory medium is not limited to the removable medium 911 shown in FIG. 9, which has program stored therein and is distributed separately from the apparatus so as to provide the programs to users. The removable medium 911 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 902 and the memory section 908 in which programs are stored, and can be distributed to users along with the device in which they are incorporated.

A program product storing machine readable instruction codes is further provided according to the present disclosure. The instruction codes can perform the method according to the embodiments of the present disclosure when being read and executed by a machine.

Accordingly, a non-transitory computer readable storage medium for carrying the program product in which machine-readable instruction codes are stored is also covered in the present disclosure. The storage medium includes but is not limited to floppy, optical disc, magnetic optical disc, memory card, memory stick and the like.

It should be understood by those skilled in the art that, what are listed herein are exemplary, and the present disclosure is not limited thereto.

In the specification, representations such as "first", "second" and "n-th" are used for distinguishing the described features literally, to clearly describe the present disclosure and should not be construed as limiting.

As an example, the steps of the above method and the modules and/or units of the above device may be implemented by software, firmware, hardware or a combination thereof, and serve as a portion of an apparatus. In the case that the modules and/or units of the above device are configured by software, firmware, hardware or a combination thereof, an available means or approach may be well known by those skilled in the art and is not described hereinafter.

As an example, in the case where the present disclosure is realized by software or firmware, a program constituting the software is installed in a computer with a dedicated hardware structure (such as the general computer 900 shown in FIG. 9) from a storage medium or network. The computer is capable of implementing various functions when installed with various programs.

In the above description of the embodiments of the present disclosure, features that are described and/or illustrated with respect to one embodiment may be used in the same way or in a similar way in one or more other embodiments, in combination with or instead of the features of the other embodiments.

It should be emphasized that the term "comprising/including" when used in this specification is taken to specify the presence of features, elements, steps or components, but does not preclude the presence or addition of one or more other features, elements, steps or components.

In addition, the method according to the present disclosure are not limited to be executed in the time sequencing described in the specification, and may be executed sequentially, in parallel or independently. Therefore, the execution order of the method described in the specification is not intended to limit the technical scope of the present disclosure.

The present disclosure and its advantages are described in the above. However, it should be understood that, various changes, replacements and transformations can be made to the present disclosure without exceeding the spirit and scope defined by the appended claims. In addition, the present disclosure is not limited to the processes, devices, means, methods and steps in the embodiments described in the specification. It is easily understood by those skilled in the art from the present disclosure that, existing processes, devices, means, methods or steps and processes, devices, means, methods or steps to be developed in the future, which have the substantially same functions as the embodiments herein or can achieve a substantially same result as the embodiments herein may be used or performed according to the present disclosure. Therefore, the appended claims are intended to include these processes, devices, means, methods or steps within the scope thereof.

As can be seen from the above description, at least the following technical solutions are disclosed according to the present disclosure.

APPENDIX 1

A method for augmenting data in a monitoring video, comprising:
selecting randomly, based on a function to be implemented for the data and a parameter range which are set by a user or by default, one or more processing functions to be performed on the data and parameters of the processing functions;
processing the data using the selected one or more processing functions, to obtain new data; and
repeating the selecting and the processing until a required amount of data is generated.

APPENDIX 2

The method according to Appendix 1, where the one or more processing functions comprise:
spatial transformation, illumination change, noise filtering, scene synthesis and event modification.

APPENDIX 3

The method according to claim Appendix 2, wherein
the selected one or more processing functions are performed in a random order, and
in the case that the selected one or more processing functions comprise the scene synthesis, the scene synthesis is first performed on the data, and then the processing functions other than the scene synthesis are performed in a random order.

APPENDIX 4

The method according to Appendix 2, where the spatial transformation comprises one or more of:
image spatial stretching, image rotation, image cropping, and image distortion simulation.

APPENDIX 5

The method according to Appendix 4, where the image distortion simulation is to simulate images captured by different imaging apparatuses, and comprises:
correcting distortion of the image based on a known parameter of the imaging apparatus; and
applying a new imaging parameter to the corrected image.

APPENDIX 6

The method according to Appendix 2, where the illumination change comprises a random illumination change and a video scene-based illumination change, where
the random illumination change comprises: in a color space comprising hue, randomly changing values of one or more color components other than the hue while maintaining the hue unchanged; and the video scene-based illumination change comprises: processing each frame of a video by: for an n-th frame of the video, selecting randomly a frame which precedes or follows the n-th frame and is spaced from the n-th frame by m frames as a reference; and applying histogram matching to an (n+m)-th frame or an (n−m)-th frame to obtain a new n-th frame, with n and m being any positive integers.

APPENDIX 7

The method according to Appendix 2, where the noise filtering comprises noise addition and out-of-focus simulation, where the noise addition comprises changing an original value of a pixel at a random position in an image with a random number; and the out-of-focus simulation comprises resetting values of all or a part of pixels in an image calculated using a filtering function based on values of neighboring pixels or performing out-of-focus simulation based on a camera parameter and an estimated object distance.

APPENDIX 8

The method according to Appendix 2, where the scene synthesis comprises:

providing, through a material library, materials of an object and a scene which exist in the monitoring video;

simulating various actions;

organizing the materials from the material library to generate a virtual monitoring image.

APPENDIX 9

The method according to Appendix 8, where the event modification comprises: event deletion and event addition, where the event deletion comprises:

detecting an event, deleting an object related to the event, and repairing a scene in which the object is deleted to generate a new image; and the event addition comprises:

extracting scene information, specifying an event range, and adding an event using a function from the scene synthesis.

APPENDIX 10

An apparatus for augmenting data in a monitoring video, comprising:

a function selection unit configured to select randomly, based on a function to be implemented for the data and a parameter range which are set by a user or by default, one or more function sub-units for processing the data;

a processing unit, configured to process the data using the selected one or more function sub-units, to obtain new data; and a repetition control unit, configured to repeat processing performed by the function selection unit and the processing unit, until a required amount of data is generated.

APPENDIX 11

The apparatus according to Appendix 10, where the function sub-units comprise:

a spatial transformation sub-unit, an illumination change sub-unit, a noise filtering sub-unit, a scene synthesis sub-unit and an event modification sub-unit.

APPENDIX 12

The apparatus according to Appendix 11, where processing of the selected one or more function sub-units is performed in a random order, and in the case that the selected function sub-units comprise the scene synthesis sub-unit, the data is first processed using the scene synthesis sub-unit, and then the processing of the function sub-units other than the scene synthesis sub-unit is performed in a random order.

APPENDIX 13

The apparatus according to Appendix 11, where the spatial transformation sub-unit is configured to perform one or more of:

image spatial stretching, image rotation, image cropping, and image distortion simulation.

APPENDIX 14

The apparatus according to Appendix 13, where the image distortion simulation is to simulate images captured by different imaging apparatuses, and comprises:

correcting distortion of the image based on a known parameter of the imaging apparatus; and applying a new imaging parameter to the corrected image.

APPENDIX 15

The apparatus according to Appendix 11, where the illumination change sub-unit is configured to perform one or more of a random illumination change and a video scene-based illumination change, where the random illumination change comprises: in a color space comprising hue, randomly changing values of one or more color components other than the hue while maintaining the hue unchanged; and the video scene-based illumination change comprises: processing each frame of a video by: for an n-th frame of the video, selecting randomly a frame which precedes or follows the n-th frame and is spaced from the n-th frame by m frames as a reference; and applying histogram matching to an (n+m)-th frame or an (n−m)-th frame to obtain a new n-th frame, with n and m being any positive integers.

APPENDIX 16

The apparatus according to Appendix 11, where the noise filtering sub-unit is configured to perform one or more of noise addition and out-of-focus simulation, where the noise addition comprises changing an original value of a pixel at a random position in an image with a random number; and the out-of-focus simulation comprises resetting values of all or a part of pixels in an image calculated using a filtering function based on values of neighboring pixels or performing out-of-focus simulation based on a camera parameter and an estimated object distance.

APPENDIX 17

The apparatus according to Appendix 11, where the scene synthesis sub-unit is configured to:

provide, through a material library, materials of an object and a scene which exist in the monitoring video;
simulate various actions;
organize the materials from the material library to generate a virtual monitoring image.

APPENDIX 18

The apparatus according to Appendix 11, where the event modification sub-unit is configured to perform one or more of: event deletion and event addition, where
the event deletion comprises:
detecting an event,
deleting an object related to the event, and
repairing a scene in which the object is deleted to generate a new image; and
the event addition comprises:
extracting scene information,
specifying an event range, and
adding an event using a function from the scene synthesis.

Although a few embodiments have been shown and described, it would be appreciated by those skilled in the art that changes may be made in these embodiments without departing from the principles and spirit thereof, the scope of which is defined in the claims and their equivalents.

What is claimed is:

1. A method for augmenting image data in a monitoring video, comprising:
selecting randomly, based on a function to be implemented for the image data and a parameter range which are set one of by a user and by default, one or more processing functions to be performed on the image data and parameters of the one or more processing functions;
processing the image data using randomly selected one or more processing functions and randomly selected parameters, to obtain new image data with randomness and comprehensiveness as augmented image data; and
repeating the selecting and the processing until a required amount of augmented image data is generated,
wherein the one or more processing functions comprise: spatial transformation, illumination change, noise filtering, scene synthesis and event modification,
wherein the selected one or more processing functions are performed in a random order, and
when the selected one or more processing functions comprise the scene synthesis, the scene synthesis is first performed on the image data, and then processing functions other than the scene synthesis are performed in a random order.

2. The method according to claim 1, wherein the spatial transformation comprises one or more of:
image spatial stretching, image rotation, image cropping, and image distortion simulation.

3. The method according to claim 2, wherein the image distortion simulation is to simulate images captured by different imaging apparatuses, and comprises:
correcting distortion of an image based on a known parameter of an imaging apparatus to produce a corrected image; and
applying a new imaging parameter to the corrected image.

4. The method according to claim 1, wherein the illumination change comprises a random illumination change and a video scene-based illumination change, wherein
the random illumination change comprises: in a color space comprising hue, randomly changing values of one or more color components other than the hue while maintaining the hue unchanged; and
the video scene-based illumination change comprises:
processing each frame of a video by: for an n-th frame of the video,
selecting randomly a frame which one of precedes and follows the n-th frame and is spaced from the n-th frame by m frames as a reference; and
applying histogram matching to one of an (n+m)-th frame and an (n−m)-th frame to obtain a new n-th frame, with n and m being any positive integers.

5. The method according to claim 1, wherein the noise filtering comprises noise addition and out-of-focus simulation, wherein
the noise addition comprises changing an original value of a pixel at a random position in an image with a random number; and
the out-of-focus simulation comprises one of resetting values of one of all and a part of pixels in the image calculated using a filtering function based on values of neighboring pixels and performing out-of-focus simulation based on a camera parameter and an estimated object distance.

6. The method according to claim 1, wherein the scene synthesis comprises:
providing, through a material library, materials of an object and a scene which exist in the monitoring video;
simulating various actions; and
organizing the materials from the material library to generate a virtual monitoring image.

7. The method according to claim 1, wherein the event modification comprises: event deletion and event addition, wherein
the event deletion comprises:
detecting an event,
deleting an object related to the event, and
repairing a scene in which the object is deleted to generate a new image; and
the event addition comprises:
extracting scene information,
specifying an event range, and
adding an event using a function from the scene synthesis.

8. An apparatus for augmenting image data in a monitoring video, comprising:
a function selector configured to select randomly, based on a function to be implemented for the image data and a parameter range which are set one of by a user and by default, one or more function sub-units for processing the image data and parameters for the one or more function sub-units;
a processor, configured to process the image data using randomly selected one or more function sub-units and randomly selected parameters, to obtain new image data with randomness and comprehensiveness as augmented image data; and
a repetition controller, configured to repeat processing performed by the function selector and the processor, until a required amount of augmented image data is generated,
wherein the function sub-units comprise:
a spatial transformation sub-unit, an illumination change sub-unit, a noise filtering sub-unit, a scene synthesis sub-unit and an event modification sub-unit,
wherein processing of the selected one or more function sub-units is performed in a random order, and when the selected function sub-units comprise the scene synthesis sub-unit, the image data is first processed using the scene synthesis sub-unit, and then processing of the function sub-units other than the scene synthesis sub-unit is performed in a random order.

9. The apparatus according to claim 8, wherein the spatial transformation sub-unit is configured to perform one or more of:
image spatial stretching, image rotation, image cropping, and image distortion simulation.

10. The apparatus according to claim 9, wherein the image distortion simulation is to simulate images captured by different imaging apparatuses, and comprises:
correcting distortion of an image based on a known parameter of an imaging apparatus; and
applying a new imaging parameter to a corrected image.

11. The apparatus according to claim 8, wherein the illumination change sub-unit is configured to perform one or more of a random illumination change and a video scene-based illumination change, wherein
the random illumination change comprises: in a color space comprising hue, randomly changing values of one or more color components other than the hue while maintaining the hue unchanged; and
the video scene-based illumination change comprises:
processing each frame of a video by: for an n-th frame of the video,
selecting randomly a frame which one of precedes and follows the n-th frame and is spaced from the n-th frame by m frames as a reference; and
applying histogram matching to one of an (n+m)-th frame and an (n−m)-th frame to obtain a new n-th frame, with n and m being any positive integers.

12. The apparatus according to claim 8, wherein the noise filtering sub-unit is configured to perform one or more of noise addition and out-of-focus simulation, wherein
the noise addition comprises changing an original value of a pixel at a random position in an image with a random number; and
the out-of-focus simulation comprises one of resetting values of one of all and a part of pixels in an image calculated using a filtering function based on values of neighboring pixels and performing out-of-focus simulation based on a camera parameter and an estimated object distance.

13. The apparatus according to claim 8, wherein the scene synthesis sub-unit is configured to:
provide, through a material library, materials of an object and a scene which exist in the monitoring video;
simulate various actions; and
organize the materials from the material library to generate a virtual monitoring image.

14. The apparatus according to claim 8, wherein the event modification sub-unit is configured to perform one or more of: event deletion and event addition, wherein
the event deletion comprises:
detecting an event,
deleting an object related to the event, and
repairing a scene in which the object is deleted to generate a new image; and
the event addition comprises:
extracting scene information,
specifying an event range, and
adding an event using a function from the scene synthesis.

15. A non-transitory computer readable storage medium storing a program which, when being executed by a computer, causes the computer to implement the method according to claim 1.

* * * * *